(12) United States Patent
Itoh

(10) Patent No.: US 8,584,451 B2
(45) Date of Patent: Nov. 19, 2013

(54) EXHAUST GAS PURIFICATION APPARATUS FOR AN INTERNAL COMBUSTION ENGINE

(75) Inventor: Kazuhiro Itoh, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 13 days.

(21) Appl. No.: 13/395,322

(22) PCT Filed: Sep. 10, 2009

(86) PCT No.: PCT/JP2009/065799
§ 371 (c)(1),
(2), (4) Date: Mar. 9, 2012

(87) PCT Pub. No.: WO2011/030419
PCT Pub. Date: Mar. 17, 2011

(65) Prior Publication Data
US 2012/0167557 A1      Jul. 5, 2012

(51) Int. Cl.
 F01N 3/00    (2006.01)
 F01N 3/02    (2006.01)
 F01N 3/20    (2006.01)

(52) U.S. Cl.
 USPC .............. 60/324; 60/286; 60/295; 60/317

(58) Field of Classification Search
 USPC .............................. 60/286, 295, 317, 324
 See application file for complete search history.

(56) References Cited

U.S. PATENT DOCUMENTS

| | | | |
|---|---|---|---|
| 8,061,130 B2 * | 11/2011 | Shibasaki | 60/323 |
| 2007/0036694 A1 | 2/2007 | Nishioka et al. | |
| 2007/0220867 A1 | 9/2007 | Clerc et al. | |
| 2009/0019837 A1 | 1/2009 | Suzuki et al. | |
| 2009/0071133 A1 * | 3/2009 | Mabuchi | 60/303 |
| 2009/0250041 A1 * | 10/2009 | Minami | 123/568.12 |
| 2009/0288405 A1 * | 11/2009 | Shibasaki | 60/323 |

FOREIGN PATENT DOCUMENTS

| | | |
|---|---|---|
| CN | 101349182 | 1/2009 |
| JP | A-2006-342735 | 12/2006 |
| JP | A-2007-32472 | 2/2007 |
| JP | A-2008-231926 | 10/2008 |
| JP | A-2009-24628 | 2/2009 |
| JP | A-2009-209804 | 9/2009 |
| JP | A-2009-531580 | 9/2009 |
| JP | A-2009-270450 | 11/2009 |

OTHER PUBLICATIONS

International Search Report issued in International Patent Application No. PCT/JP2009/065799 dated Dec. 22, 2009.

* cited by examiner

*Primary Examiner* — Thomas Denion
*Assistant Examiner* — Dapinder Singh
(74) *Attorney, Agent, or Firm* — Oliff & Berridge, PLC

(57) ABSTRACT

A liquid additive agent added into an exhaust gas is suppressed from adhering to a sensor. Provision is made for a sensor that is arranged in an exhaust passage of an internal combustion engine; an addition valve that is arranged in the vicinity of or at the downstream side of the sensor in the direction of flow of the exhaust gas, and adds an additive agent into the exhaust passage; a catalyst that is arranged at the downstream side of the addition valve, and receives a supply of the additive agent from the addition valve; and pressure difference generation unit that makes a pressure of the exhaust gas in the surrounding of the sensor higher than a pressure thereof in the surrounding of the addition valve. A pressure difference is caused to generate so that the additive agent is suppressed from flowing toward the direction of the sensor.

1 Claim, 12 Drawing Sheets

EXHAUST GAS PURIFICATION APPARATUS FOR AN INTERNAL COMBUSTION ENGINE

TECHNICAL FIELD

The present invention relates to an exhaust gas purification apparatus for an internal combustion engine.

BACKGROUND ART

There has been known a technique in which an air fuel ratio sensor, a fuel addition valve, and an NOx storage reduction catalyst are arranged in an exhaust passage of an internal combustion engine in a sequential manner from an upstream side thereof to a downstream side thereof (for example, see a first patent document).

Here, fuel added from the fuel addition valve is added into an exhaust gas in a liquid or liquefied state. Then, this liquid fuel may adhere to the air fuel ratio sensor. Due to this adhesion of fuel, there will be a fear that the detection accuracy of an air fuel ratio may drop. In addition, the air fuel ratio sensor is maintained at a high temperature state by means of a heater in order to activate a sensor element, so when the fuel adheres to the air fuel sensor, it will be oxidized. For this reason, there will be a fear that the air fuel ratio sensor may be overheated.

Then, even if the air fuel ratio sensor is arranged at the upstream side of the fuel addition valve, there will be a fear that the fuel added into the exhaust gas may be caused to flow toward the upstream side thereof due to the pulsation of the exhaust gas, thus adhering to the air fuel ratio sensor. This can be said that the same will also occur in the case of an NOx sensor, etc., which serves to detect an NOx concentration in the exhaust gas. In addition, it can be said that the same will occur even in cases where urea or ammonia is added as a reducing agent.

PRIOR ART REFERENCES

Patent Documents

First Patent Document: Japanese patent application laid-open No. 2008-231926

SUMMARY OF THE INVENTION

Problems to be Solved by the Invention

The present invention has been made in view of the problems as mentioned above, and has for its object to provide a technique of suppressing a liquid additive agent added to an exhaust gas from adhering to a sensor.

Means for Solving the Problems

In order to achieve the above-mentioned object, an exhaust gas purification apparatus for an internal combustion engine according to the present invention adopts the following means. That is, the exhaust gas purification apparatus for an internal combustion engine according to the present invention is comprising:

a sensor that is arranged in an exhaust passage of the internal combustion engine;

an addition valve that is arranged in the vicinity of or at the downstream side of said sensor in the direction of flow of an exhaust gas, and adds an additive agent into said exhaust passage;

a catalyst that is arranged at the downstream side of said addition valve, and receives a supply of the additive agent from said addition valve; and pressure difference generation unit that makes a pressure of the exhaust gas in the surrounding of said sensor higher than a pressure thereof in the surrounding of said addition valve.

The sensor may be a sensor that detects a state of the exhaust gas, or may be a sensor that detects a concentration of a specific component in the exhaust gas. The addition valve adds, for example, a reducing agent or an oxidizing agent as the additive agent. Then, this additive agent reacts with the catalyst, so that it purifies the exhaust gas or raises the temperature of the exhaust gas. Moreover, the additive agent may be used so as to recover the purification capacity or ability of the catalyst. That is, by receiving the supply of the additive agent, the catalyst purifies the exhaust gas, or raises the temperature of the exhaust gas, or recovers its purification ability, for example.

The pressure difference generation unit serves to generate a pressure difference between the surrounding of the sensor and the surrounding of the addition valve. The pressure in the surrounding of the addition valve can include a pressure in a range of spraying of the additive agent. Then, by making the pressure of the exhaust gas in the surrounding of the sensor higher than the pressure of the exhaust gas in the surrounding of the addition valve, it is possible to suppress the exhaust gas from flowing into a sensor side from an addition valve side. For this reason, it is possible to suppress the additive agent from adhering to the sensor.

Here, note that said pressure difference generation unit may be constructed to be provided with a partition plate that serves to separate an exhaust gas which flows through the surrounding of said sensor, and an exhaust gas which flows through the surrounding of said addition valve, from each other.

Here, if the sensor protrudes into the exhaust passage, there will be a pressure loss, or turbulence will be caused to generate in the flow of the exhaust gas. As a result, a pressure of the exhaust gas at the side nearer to the sensor than to the partition plate becomes higher than a pressure of the exhaust gas at the side nearer to the addition valve than the partition plate. Here, note that the partition plate may be composed of a plate with a flat surface, or may be composed of a plate with a curved surface. Further, the partition plate may be composed of a corrugated plate, or may be composed of a bent plate. The partition plate may just be arranged in a range in which the pressure of the exhaust gas in the surrounding of the sensor becomes higher than the pressure of the exhaust gas in the surrounding of the addition valve. With such an arrangement, the pressure of the exhaust gas at the side nearer to the addition valve than the partition plate becomes lower than the pressure of the exhaust gas at the side nearer to the sensor than the partition plate, so even if the additive agent flows backwards, it is possible to suppress the additive agent from flowing into the sensor side at which the pressure of the exhaust gas is high. In addition, due to the collision of the additive agent with the partition plate, it is possible to cause the additive agent to disperse in a wider range, so that the reaction of the additive agent in the catalyst can be facilitated.

In addition, said exhaust passage may be separated into two exhaust passage portions by means of said partition plate, and said sensor may be arranged in one of the exhaust passage portions, whereas said addition valve may be arranged in the other of the exhaust passage portions, wherein the one exhaust passage portion with said sensor arranged therein can be formed with a part of which a channel cross section becomes small.

If doing so, a pressure loss at the time of the exhaust gas passing through the one exhaust passage portion becomes larger, so the pressure difference between the surrounding of the addition valve and the surrounding of the sensor can be made larger. For this reason, it is possible to suppress the additive agent from adhering to the sensor in a more effective manner.

Moreover, said pressure difference generation unit may be constructed to be provided with resistance unit that serves to resist or obstruct the flow of the exhaust gas in a portion of the exhaust passage between said sensor and said addition valve; and said sensor may be arranged at the upstream side of said resistance unit, and said addition valve may be arranged at the downstream side of said resistance unit.

That is, because the pressure of the exhaust gas at the upstream side of the resistance unit becomes higher than the pressure of the exhaust gas at the downstream side thereof, the pressure of the exhaust gas at the side of the sensor becomes higher than the pressure of the exhaust gas at the side of the addition valve. As a result of this, it is possible to suppress the additive agent from flowing toward the sensor side, so it is possible to suppress the additive agent from adhering to the sensor. In addition, due to the adhesion of the additive agent to the resistance unit, it is possible to decrease the amount of the additive agent flowing toward the sensor side.

Said resistance unit may be constructed to be provided with a swirling device that causes the exhaust gas to swirl. By causing the exhaust gas to swirl, this swirling device serves to make uniform the components of the exhaust gas in the exhaust passage, or to cause the additive agent added from the addition valve to disperse in a wider range. However, the swirling device itself acts as a resistance to the flow of the exhaust gas, and hence serves as a boundary, so that the pressure of the exhaust gas at the upstream side of the swirling device can be made higher than the pressure of the exhaust gas at the downstream side of the swirling device.

Here, note that said resistance unit may be constructed to be provided with a catalyst. In addition, said resistance unit may be constructed to be provided with a plate that is at an inclination with respect to the direction of a central axis of said exhaust passage.

That is, these act as resistances to the flow of the exhaust gas, so a pressure difference is generated across each of these, which serves as a boundary. As a result, the pressure of the exhaust gas in the surrounding of the sensor becomes higher than the pressure of the exhaust gas in the surrounding of the addition valve, thus making it possible to suppress the additive agent from adhering to the sensor.

Effect of the Invention

According to the present invention, it is possible to suppress a liquid additive agent added into an exhaust gas from adhering to a sensor.

MODES FOR CARRYING OUT THE INVENTION

Hereinafter, reference will be made to specific embodiments of an exhaust gas purification apparatus for an internal combustion engine according to the present invention based on the attached drawings.

First Embodiment

Figure 1:
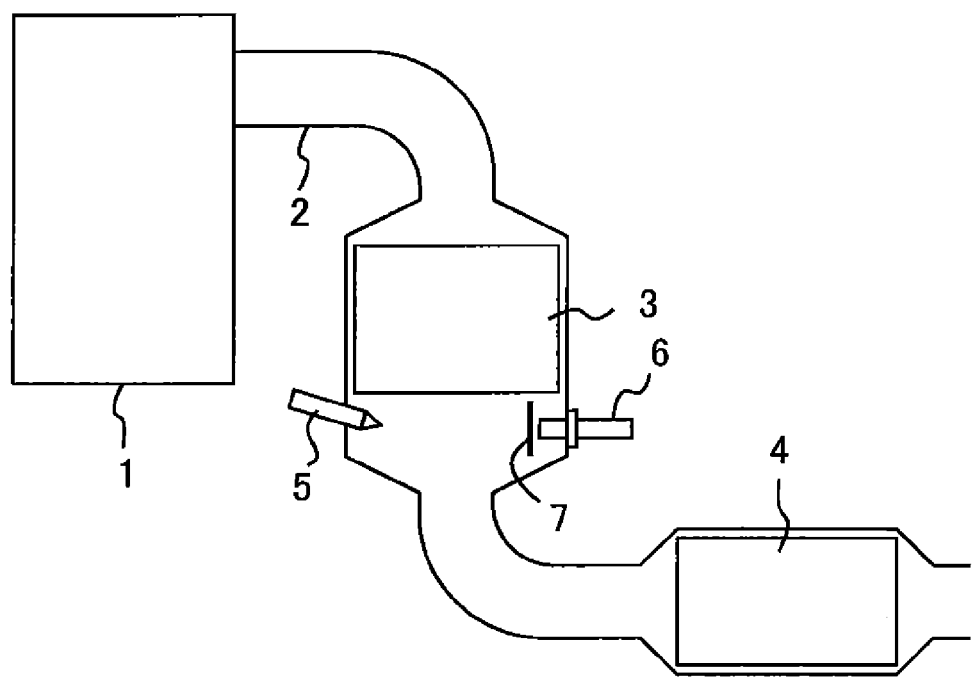
FIG. 1 is a view showing the schematic construction of an exhaust gas purification apparatus for an internal combustion engine according to a first embodiment of the present invention.

FIG. 1 is a view showing the schematic construction of an exhaust gas purification apparatus for an internal combustion engine according to this first embodiment of the present invention. An internal combustion engine 1 shown in FIG. 1 is a four-cycle diesel engine of a water cooled type having four cylinders. Here, note that the following embodiments can be applied even to gasoline engines in a similar manner.

An exhaust passage 2 is connected to the internal combustion engine 1. A first exhaust gas purification device 3 is arranged in the exhaust passage 2. The first exhaust gas purification device 3 is provided with an oxidation catalyst, a three-way catalyst, an NOx storage reduction catalyst, or an NOx adsorption catalyst, for example. In addition, a particulate filter may be provided in which these catalysts are supported, or are arranged at a location upstream thereof. A second exhaust gas purification device 4 is arranged in the exhaust passage 2 at a location downstream of the first exhaust gas purification device 3. The second exhaust gas purification device 4 is provided with, for example, an NOx storage reduction catalyst, an NOx selective reduction catalyst, an oxidation catalyst, or a three-way catalyst. In addition, a particulate filter may be provided in which these catalysts are supported, or are arranged at a location upstream thereof. Here, note that in this embodiment, a catalyst which is provided on the second exhaust gas purification device 4 corresponds to a catalyst which receives a supply of an additive agent in the present invention.

In addition, an addition valve 5 and a sensor 6 are arranged in a portion of the exhaust passage 2 at the downstream side of the first exhaust gas purification device 3, at the upstream side of the second exhaust gas purification device 4, and at the immediate downstream side of the first exhaust gas purification device 3. The addition valve 5 is arranged at the downstream side of the sensor 4 in the direction of flow of the exhaust gas, or at a location that has no difference from (i.e., is identical with) that of the sensor 6 in the direction of flow of the exhaust gas. That is, the addition valve 5 is arranged at a location at which the sensor 6 is not positioned at the downstream side of the addition valve 5 in the direction of flow of the exhaust gas. The addition valve 5 injects a liquid additive agent such as a reducing agent, an oxidizing agent or the like. For the additive agent, there can be used, for example, fuel, or urea, or ammonia. What is used for the additive agent is decided according to the kind of a catalyst which is provided in the second exhaust gas purification apparatus 4. Then, the additive agent reacts with the catalyst which is provided in the second exhaust gas purification device 4.

In addition, the sensor 6 detects the concentration of a specific component in the exhaust gas, for example. As the sensor 6, there can be mentioned, for example, an air fuel ratio sensor, an oxygen concentration sensor, an HC sensor, or an NOx sensor.

Figure 2:
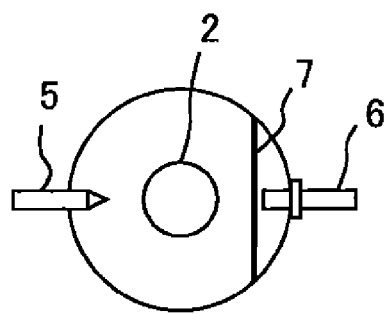
FIG. 2 is a view looking at an addition valve, a sensor and a partition plate from an upstream side of an exhaust passage.

In the vicinity of the sensor 6, there are arranged a partition plate 7 by which an exhaust gas passing through the surrounding of the sensor 6, and an exhaust gas passing through the surrounding of the addition valve 5 are divided or partitioned from each other. That is, the partition plate 7 divides or separates the exhaust passage 2 into two portions. Here, FIG. 2 is a view looking at the addition valve 5, the sensor 6 and the partition plate 7 from the upstream side of the exhaust passage 2. The partition plate 7 is a metal plate which has a surface parallel to the direction of a central axis of the exhaust passage 2. The partition plate 7 may also be a plate which is arranged in parallel to the flow of the exhaust gas. This partition plate 7 is placed between the addition valve 5 and the sensor 6. And, the partition plate 7 is arranged in such a manner that a channel cross section of the exhaust passage 2 at the side of the sensor 6 from the partition plate 7 becomes smaller than a channel cross section thereof at the side of the addition valve 5 from the partition plate 7. That is, the partition plate 7 is arranged at a location nearer to the sensor 6 than to the addition valve 5. Here, note that the partition plate 7 may be bent, or may be formed of a curved surface. In addition, the partition plate 7 may be a corrugated plate.

A relatively small space is formed in the surrounding of the sensor 6 by means of the partition plate 7. Here, in order to decrease a pressure loss in the first exhaust gas purification device 3, the diameter of the exhaust passage 2 in the first exhaust gas purification device 3 is made to be larger than those portions thereof which are arranged at the upstream side and at the downstream side thereof. Then, the addition valve 5, the sensor 6 and the partition plate 7 are arranged in this portion of the exhaust passage 2 of which the diameter is large. In addition, the partition plate 7 has a downstream end thereof located in a portion of the exhaust passage 2 of which the diameter is made smaller (or decreases), so that a channel cross section at the side of the sensor 6 at an upstream end of the partition plate 7 is larger than a channel cross section at the side of the sensor 6 at the downstream end of the partition plate 7. Rates at which these channel cross sections decrease, respectively, are such that the rate at the side of the sensor 6 is larger than the rate at the side of the addition valve 5. By doing in this manner, the resistance of the flow of the exhaust gas at the side of the sensor 6 from the partition plate 7 becomes larger than the resistance of the flow of the exhaust gas at the side of the addition valve 5 from the partition plate 7, so the pressure of the exhaust gas at the side of the sensor 6 becomes higher than the pressure thereof at the side of the addition valve 5. That is, a pressure difference is generated at the side of the addition valve 5 and at the side of the sensor 6, across the partition plate 7.

Here, the additive agent added into the exhaust gas from the addition valve 5 flows toward the downstream thereof, while being entrained on the flow of the exhaust gas. Then, the exhaust gas is purified by the reaction of the additive agent in the second exhaust gas purification device 4. However, the additive agent is caused to flow backwards in the exhaust passage 2 due to the pulsation of the exhaust gas, so there is a fear that the additive agent may adhere to the sensor 6. Thus, when the additive agent adheres to the sensor 6, there is a fear that the deterioration of the sensor 6 may progress or the detection accuracy of the sensor 6 may drop. On the other hand, in this embodiment, provision is made for the partition plate 7. With this partition plate 7, the pressure at the side of the sensor 6 from the partition plate 7 becomes higher than the pressure at the side of the addition valve 5 from the partition plate 7, so even if the additive agent flows backwards, it is possible to suppress the additive agent from flowing into a flow passage at the side of the sensor 6. That is, it is possible to suppress the additive agent from adhering to the sensor 6.

Here, note that in this embodiment, the partition plate 7 is arranged in parallel to the direction of flow of the exhaust gas, and the wall surface of the exhaust passage 2 is bent toward the side of the downstream end of the partition plate 7, so that the channel cross sections are made smaller (to decrease), but instead of this, a channel cross section may be made smaller by bending the downstream end of the partition plate 7 toward the side of the adjacent wall surface of the exhaust passage 2.

In addition, if the sensor 6 is arranged to protrude in the flow of the exhaust gas, the sensor 6 itself will serve as a resistance to the flow of the exhaust gas. Accordingly, even if there is no change in the channel cross sections, the pressure at the side of the sensor 6 becomes higher than that at the side of the addition valve 5. That is, even if there is no change in the channel cross sections, it is possible to suppress the additive agent from flowing at the side of the sensor 6.

Moreover, in this embodiment, the addition valve 5 and the sensor 6 are mounted on or arranged in that portion of the exhaust passage 2 which is at the immediate downstream side of the first exhaust gas purification device 3 and of which the channel cross section is relatively large, but instead of this, even if the addition valve 5 and the sensor 6 are mounted on or arranged in a portion of the exhaust passage which is at the downstream side of the above-mentioned portion thereof and of which the channel cross section is relatively small, the same effects will be able to be obtained. In addition, the first exhaust gas purification device 3 may be omitted.

As described above, according to this embodiment, the pressure of the exhaust gas at the side of the sensor 6 from the partition plate 7 can be maintained at a higher level, as compared with the pressure thereof at the side of the addition valve 5 from the partition plate 7. As a result of this, it is possible to suppress the additive agent from adhering to the sensor 6. Here, note that in this embodiment, the partition plate 7 corresponds to pressure difference generation unit in the present invention.

In addition, the distance between the addition valve 5 and the second exhaust gas purification device 4 can be made longer, so it is possible to facilitate atomization, evaporation and diffusion of the additive agent which is added from the addition valve 5.

Moreover, it is possible to suppress the additive agent from adhering to the sensor 6, so a drop in the temperature of the sensor 6 can be suppressed. As a result of this, the electric power consumed to heat the sensor 6 can be decreased.

Second Embodiment

Figure 3:
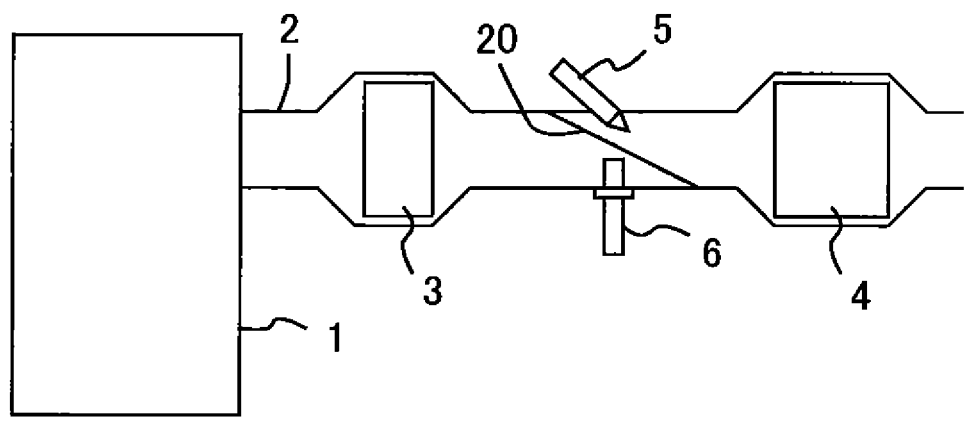
FIG. 3 is a view showing the schematic construction of an exhaust gas purification apparatus for an internal combustion engine according to a second embodiment of the present invention.

FIG. 3 is a view showing the schematic construction of an exhaust gas purification apparatus for an internal combustion engine according to this second embodiment of the present invention. Mainly, those which are different from FIG. 1 will be explained.

Figure 4:
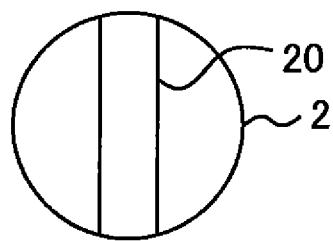
FIG. 4 is a view looking at a dispersion plate from an upstream side of an exhaust passage.

In this embodiment, a dispersion plate 20 for causing disturbance or turbulence in the flow of the exhaust gas is provided in a portion of the exhaust passage 2 between the addition valve 5 and the sensor 6. This dispersion plate 20 causes an additive agent to disperse into a wide area or range in the exhaust gas. Here, FIG. 4 is a view looking at the dispersion plate 20 from an upstream side of the exhaust passage 2.

The dispersion plate 20 is a substantially rectangular plate made of metal which has a surface inclined with respect to the direction of flow of the exhaust gas, i.e., with respect to the direction of the central axis of the exhaust passage 2. When viewed from the upstream side of the exhaust passage 2, the area of the dispersion plate 20 is smaller than the channel cross section of the exhaust passage 2. The length of the dispersion plate 20 is longer than the diameter of the exhaust passage 2, and the width thereof is shorter than the diameter of the exhaust passage 2. Then, the lengthwise or longitudinal direction of the dispersion plate 20 is inclined with respect to the direction of flow of the exhaust gas, and the widthwise or transverse direction of the dispersion plate 20 is orthogonal to the direction of flow of the exhaust gas. The dispersion plate 20 has a center thereof located on the central axis of the exhaust passage 2, and has an upstream end and a downstream end thereof welded to the wall surface of the exhaust passage 2, respectively. Here, because the width of the dispersion plate 20 is shorter than the diameter of the exhaust passage 2, the exhaust gas can flow through between the dispersion plate 20 and the wall surface of the exhaust passage 2.

Then, the sensor 6 is arranged in such a manner that it is in opposition to a surface of the dispersion plate 20 which faces the upstream side of the dispersion plate 20 in the direction of flow of the exhaust gas. In addition, the addition valve 5 is arranged in such a manner that it is in opposition to a surface of the dispersion plate 20 which faces the downstream side of the dispersion plate 20 in the direction of flow of the exhaust gas. This can be said that the sensor 6 is arranged at the upstream side of the dispersion plate 20, and the addition valve 5 is arranged at the downstream side of the dispersion plate 20.

When the dispersion plate 20 is arranged in this manner, the exhaust gas flows through the sides of the dispersion plate 20. Then, the exhaust gas before passing through the sides of the dispersion plate 20 flows through the surrounding of the sensor 6, and the exhaust gas after passing through the sides of the dispersion plate 20 flows through the surrounding of the addition valve 5.

Here, by arranging the dispersion plate 20 in the flow of the exhaust gas, turbulence arises in the flow of the exhaust gas, so the additive agent disperses in a wide area therein. Here, note that the dispersion of the additive agent may be made by causing the additive agent to collide with the dispersion plate 20. Then, due to the arrangement of the dispersion plate 20 in the flow of the exhaust gas, a pressure loss is generated by the dispersion plate 20, so the pressure at the upstream side of the dispersion plate 20 becomes higher than the pressure at the downstream side thereof. As a result of this, the additive agent is suppressed from flowing backwards to the upstream side of the dispersion plate 20, so it is possible to suppress the additive agent from adhering to the sensor 6.

Here, note that the dispersion plate 20 may be a flat plate, or it may be a corrugated plate, etc. In addition, the dispersion plate 20 may have a plurality of holes formed therethrough to open, or it may have a catalyst supported thereon. Moreover, the dispersion plate 20 may be arranged to be orthogonal to the central axis of the exhaust passage 2.

As described above, according to this embodiment, the pressure of the exhaust gas at the side of the sensor 6 from the dispersion plate 20 can be maintained at a higher level, as compared with the pressure thereof at the side of the addition valve 5 from the dispersion plate 20. As a result of this, it is possible to suppress the additive agent from adhering to the sensor 6. Here, note that in this embodiment, the dispersion plate 20 corresponds to the pressure difference generation unit or resistance unit in the present invention.

Third Embodiment

Figure 5:
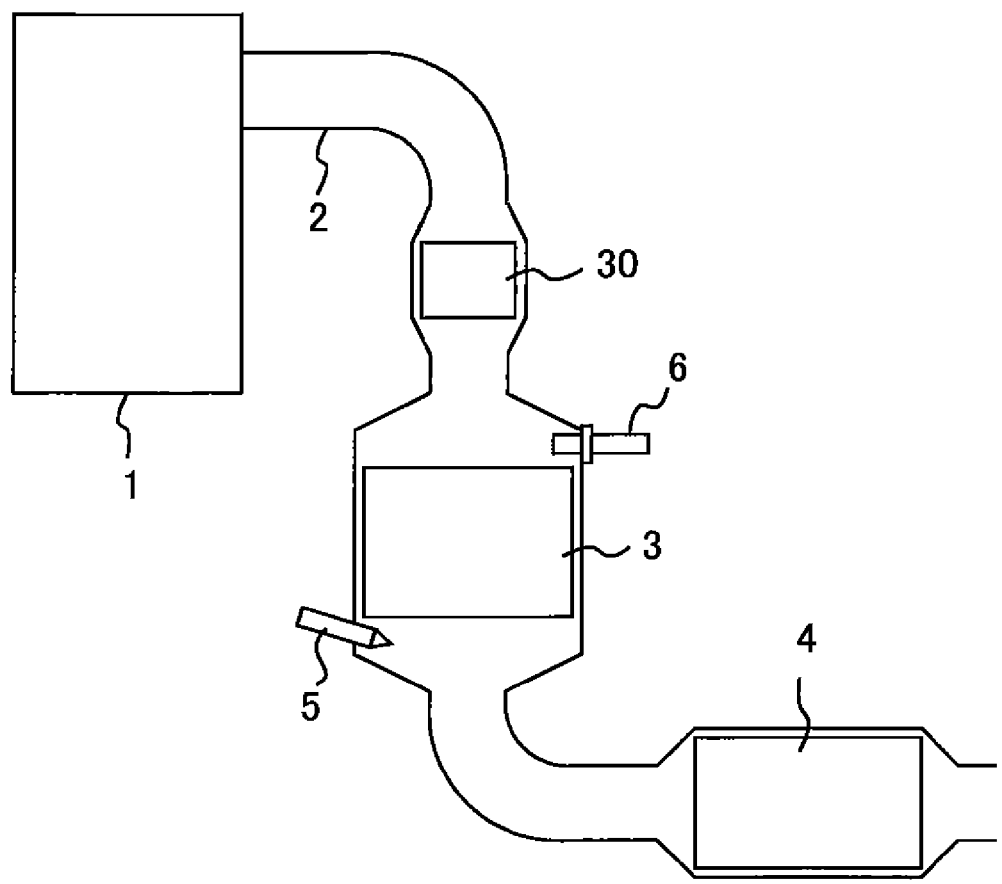
FIG. 5 is a view showing the schematic construction of an exhaust gas purification apparatus for an internal combustion engine according to a third embodiment of the present invention.

FIG. 5 is a view showing the schematic construction of an exhaust gas purification apparatus for an internal combustion engine according to this third embodiment of the present invention. Mainly, those which are different from FIG. 1 will be explained.

In this embodiment, the first exhaust gas purification device 3 is arranged in a portion of the exhaust passage 2 between the addition valve 5 and the sensor 6. Moreover, the oxidation catalyst 30 is arranged at the upstream side of the sensor 6. Here, note that the oxidation catalyst 30 may be a three-way catalyst. Because the oxidation catalyst 30 is made smaller in capacity than the first exhaust gas purification device 3 and the second exhaust gas purification device 4, respectively, it is possible to activate the oxidation catalyst 30 at an early stage. In addition, in cases where the first exhaust gas purification device 3 is a particulate filter, when the particulate matter trapped in the particulate filter is oxidized, the temperature of the particulate filter can be raised by supplying HC to the oxidation catalyst 30.

According to such a construction, a pressure loss occurs in the first exhaust gas purification device 3, so the pressure at the upstream side of the first exhaust gas purification device 3 becomes higher than the pressure at the downstream side of the first exhaust gas purification device 3. As a result, it is possible to suppress the additive agent added from the addition valve 5 from flowing backwards through the first exhaust gas purification device 3, thus making it possible to suppress the additive agent from adhering to the sensor 6. In addition, because the additive agent adheres to the first exhaust gas purification device 3 when the additive agent flows backwards, the amount of the additive agent which arrives at the sensor 6 can be decreased. Here, note that in this embodiment, the first exhaust gas purification device 3 corresponds to the pressure difference generation unit or resistance unit in the present invention.

Figure 6:
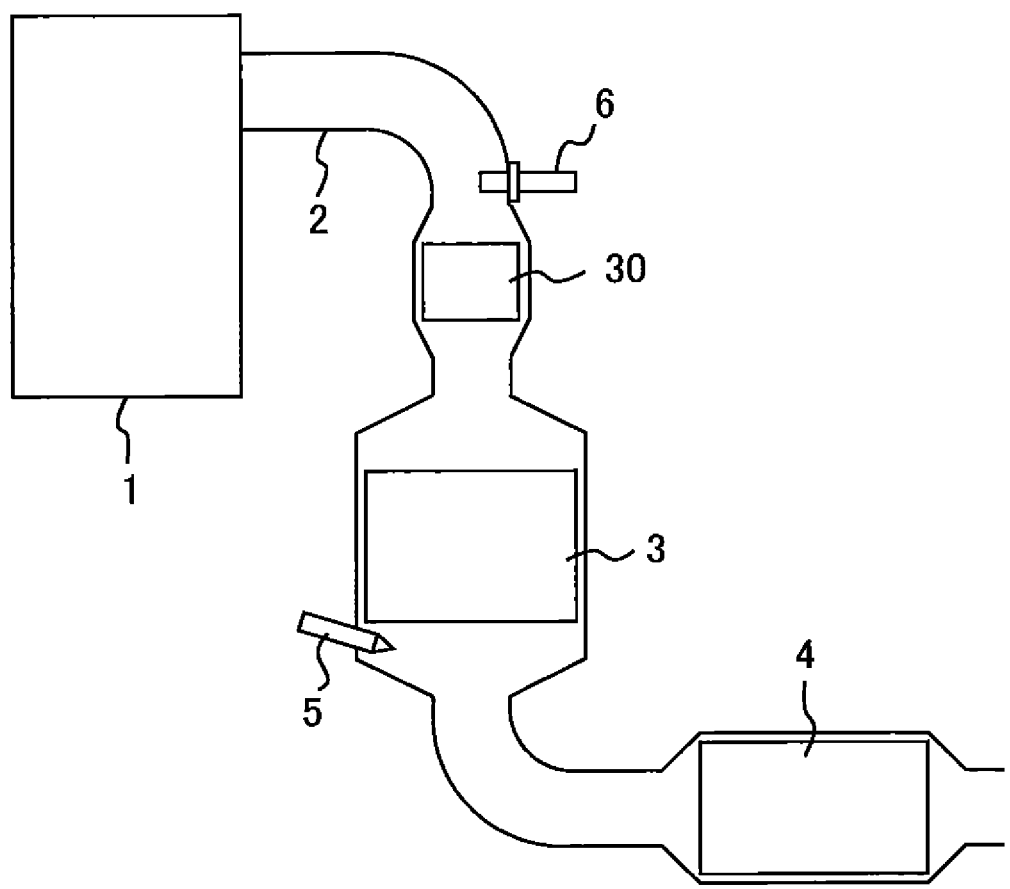
FIG. 6 is another view showing the schematic construction of the exhaust gas purification apparatus for an internal combustion engine according to the third embodiment of the present invention.

In addition, FIG. 6 is another view showing the schematic construction of the exhaust gas purification apparatus of an internal combustion engine according to this third embodiment of the present invention. Thus, the oxidation catalyst 30 may be arranged at the upstream side of the first exhaust gas purification device 3, and the sensor 6 may also be further arranged at the upstream side of the oxidation catalyst 30. If doing so, a pressure loss will occur in the oxidation catalyst 30 and the first exhaust gas purification device 3, and hence, the pressure of the exhaust gas in the surrounding of the sensor 6 becomes still higher than the pressure of the exhaust gas in the surrounding of the addition valve 5, thus making it possible to suppress the additive agent from adhering to the sensor 6 in a more effective manner. In addition, because the additive agent adheres to the first exhaust gas purification device 3 and the oxidation catalyst 30 when the additive agent flows backwards, the amount of the additive agent which arrives at the sensor 6 can be decreased. In this case, the oxidation catalyst 30 and the first exhaust gas purification device 3 correspond to the pressure difference generation unit or resistance unit in the present invention.

Fourth Embodiment

Figure 7:
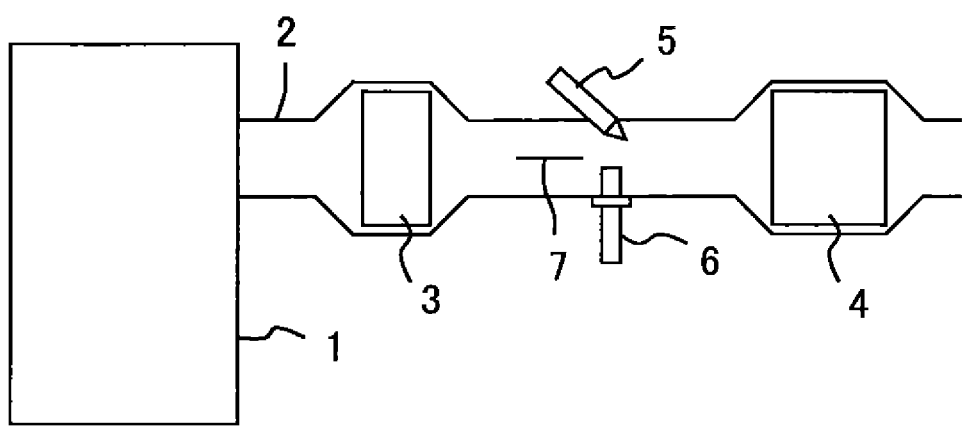
FIG. 7 is a view showing the schematic construction of an exhaust gas purification apparatus for an internal combustion engine according to a fourth embodiment of the present invention.

FIG. 7 is a view showing the schematic construction of an exhaust gas purification apparatus for an internal combustion engine according to this fourth embodiment of the present invention. Mainly, those which are different from FIG. 1 will be explained. In this embodiment, the partition plate 7 is arranged at the upstream side of the addition valve 5 and the sensor 6. That is, the partition plate 7 is not arranged between the addition valve 5 and the sensor 6.

Here, if the sensor 6 is arranged to protrude in the flow of the exhaust gas, the sensor 6 itself will serve as a resistance to the flow of the exhaust gas when the exhaust gas flows through the surrounding of the sensor 6. Then, if the partition plate 7 is in the vicinity of the sensor 6, the pressure of the exhaust gas passing at the side of the sensor 6 will become higher than the pressure of the exhaust gas passing at the side of the addition valve 5. Here, note that the positions of the partition plate 7 and the sensor 6 are obtained through experiments, etc., as positions in which it is possible to suppress the adhesion of the additive agent to the sensor 6 due to the pressure difference between the surrounding of the sensor 6 and the surrounding of the addition valve 5.

That is, the pressure of the exhaust gas in the surrounding of the sensor 6 can be made higher than the pressure of the exhaust gas in the surrounding of the addition valve 5 by arranging the partition plate 7, the sensor 6, and the addition valve 5 in such a manner that the pressure of the exhaust gas in the surrounding of the sensor 6 becomes higher than that in the surrounding of the addition valve 5. As a result, it is possible to suppress the additive agent from adhering to the sensor 6. Here, note that in this embodiment, the partition plate 7 corresponds to the pressure difference generation unit in the present invention.

Fifth Embodiment

Figure 8:
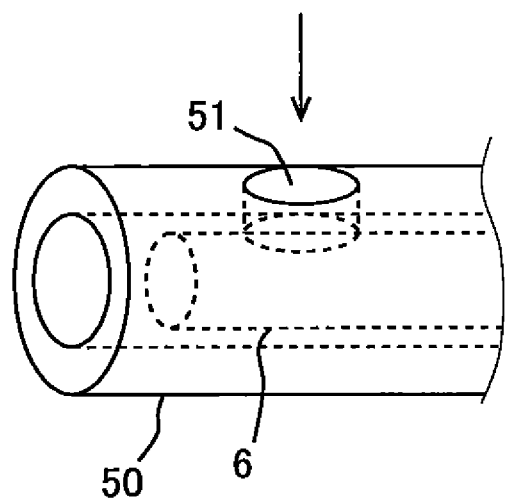
FIG. 8 is a view showing the schematic construction of an exhaust gas purification apparatus for an internal combustion engine according to a fifth embodiment of the present invention.

FIG. 8 is a view showing the schematic construction of an exhaust gas purification apparatus for an internal combustion engine according to this fifth embodiment of the present invention. Here, note that an arrow in FIG. 8 indicates a direction in which the exhaust gas flows.

In this embodiment, a cover 50 surrounding the sensor 6 is arranged, and a hole 51 is formed through the cover 50 only at the upstream side thereof. The exhaust gas is taken in from this hole 51. By doing in this manner, the pressure of the exhaust gas inside the cover 50 becomes higher than the pressure of the exhaust gas outside the cover 50. As a result, the pressure of the exhaust gas in the surrounding of the sensor 6 becomes higher than the pressure of the exhaust gas in the surrounding of the addition valve 5, thus making it possible to suppress the additive agent from adhering to the sensor 6.

Figure 9:
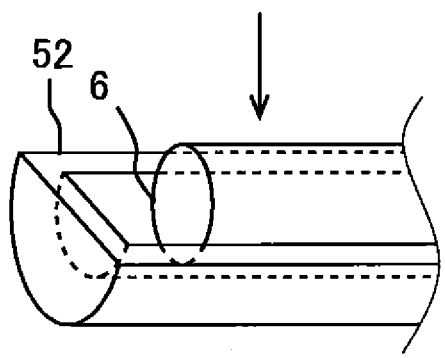
FIG. 9 is another view showing the schematic construction of the exhaust gas purification apparatus for an internal combustion engine according to the fifth embodiment of the present invention.

Here, note that instead of forming the hole 51 in the cover 50, the following measure or technique may be adopted. FIG. 9 is another view showing the schematic construction of an exhaust gas purification apparatus for an internal combustion engine according to this fifth embodiment of the present invention. An arrow in FIG. 9 indicates a direction in which the exhaust gas flows. A cover 52 shown in FIG. 9 takes a shape in which a hollow circular cylinder is cut in the direction of a central axis thereof, and serves to cover only a downstream side portion of the sensor 6. Here, note that the cover 52 may also take other shapes as long as it covers the downstream side portion of the sensor 6. According to the cover 52 shown in FIG. 9, too, the pressure of the exhaust gas in the surrounding of the sensor 6 becomes higher than the pressure of the exhaust gas in the surrounding of the addition valve 5, thus making it possible to suppress the additive agent from adhering to the sensor 6. Here, note that in this embodiment, each of the covers 50, 52 corresponds to the pressure difference generation unit in the present invention.

Sixth Embodiment

Figure 10:
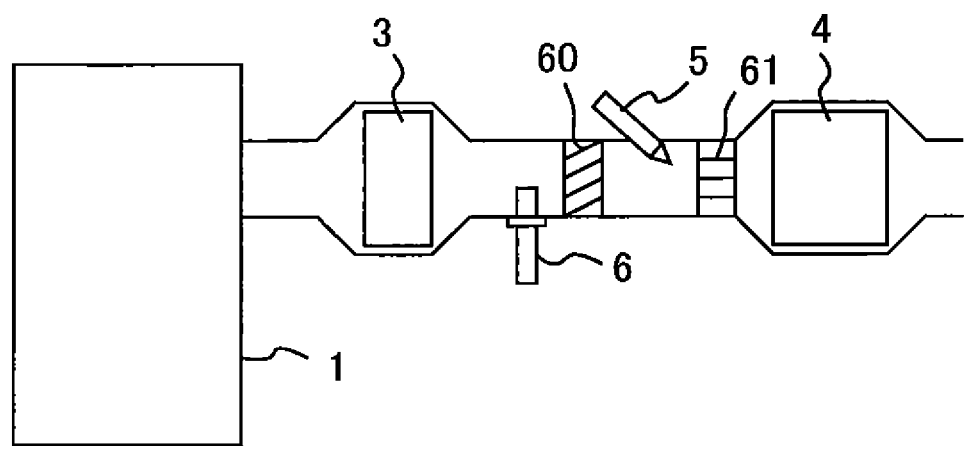
FIG. 10 is a view showing the schematic construction of an exhaust gas purification apparatus for an internal combustion engine according to a sixth embodiment of the present invention.

FIG. 10 is a view showing the schematic construction of an exhaust gas purification apparatus for an internal combustion engine according to this sixth embodiment of the present invention. Mainly, those which are different from FIG. 1 will be explained.

In this embodiment, provision is made for the first exhaust gas purification device 3, the sensor 6, a swirling device 60, the addition valve 5, a dispersion device 62, and the second exhaust gas purification device 4, which are arranged in a sequential manner from the upstream side of the exhaust passage 2.

The swirling device 60 is a device which serves to cause the exhaust gas to swirl around the central axis of the exhaust passage 2 as the center of swirling. The dispersion device 62 is a device which serves to cause the additive agent to disperse in a wide range by making a collision of the additive agent added from the addition valve 5. That is, the dispersion device 62 serves to facilitate the atomization and evaporation as well as diffusion of the additive agent, while causing the additive agent to disperse in a wide range by means of the swirling device 60 and the dispersion device 62.

Figure 11:
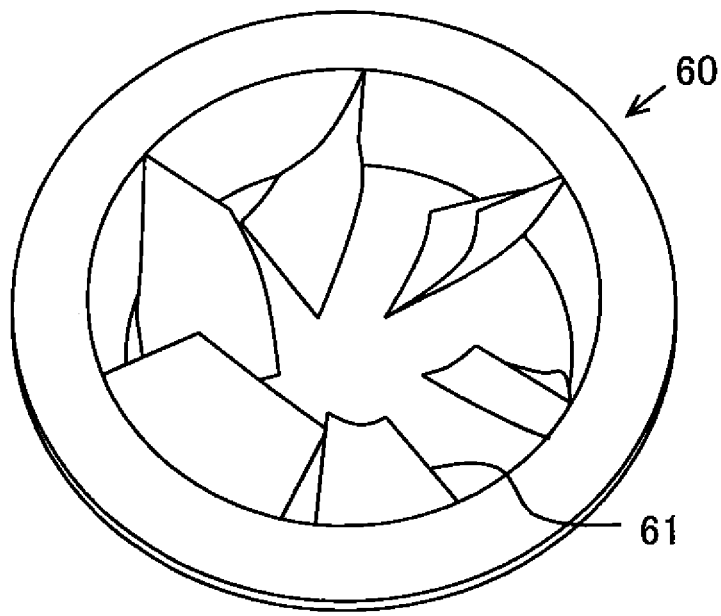
FIG. 11 is a perspective view of a swirling device.

FIG. 11 is a perspective view of the swirling device 60. The swirling device 60 is provided with a plurality of vanes 61 which are arranged at an inclination with respect to the direction of flow of the exhaust gas. These vanes 61 are protruded toward the central axis of a flow passage in the swirling device 60 from the wall surface thereof, and are arranged at circumferentially equal intervals in the surrounding of the central axis of the flow passage. According to such a swirling device 60, the direction of movement of the exhaust gas changes as the exhaust gas flowing straight ahead in the exhaust passage 2 travels along the vanes 61. Then, the exhaust gas is swirled around the central axis of the exhaust passage 2 as the center of swirling. Here, note that the shape and the number of the vanes 61 as shown in FIG. 11 are just an example, and may be other shapes and numbers thereof. In addition, other commonly known swirling devices can also be used.

Figure 12:
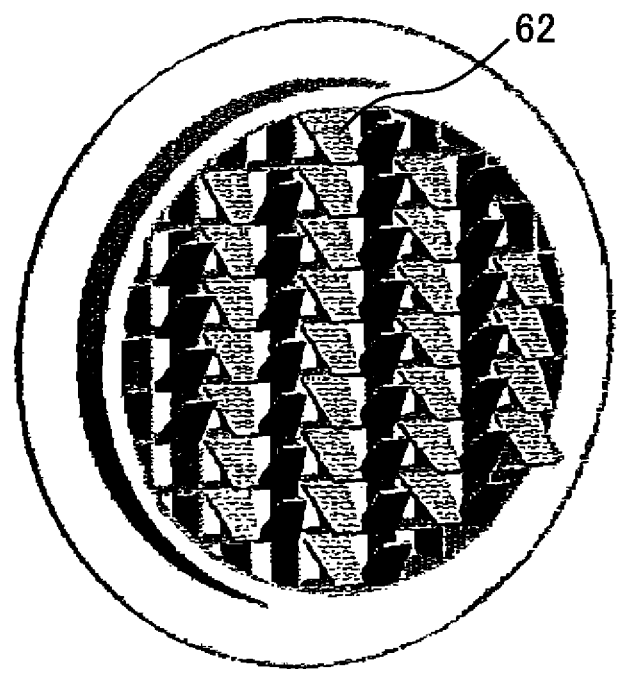
FIG. 12 is a perspective view of a dispersion device.

Moreover, FIG. 12 is a perspective view of the dispersion device 62. The dispersion device 62 is constructed such that a plurality of plates being in parallel to the direction of flow of the exhaust gas are arranged on a base in a grid or lattice pattern, and a plurality of plates being at an inclination with respect to the direction of flow of the exhaust gas are arranged at a downstream end of the base. Then, the additive agent is added toward this dispersion device 62. Here, note that the shape shown in FIG. 12 is just an example, and other commonly known dispersion devices can also be used.

In the exhaust gas purification apparatus for an internal combustion engine as constructed in this manner, the swirling device 60 acts as a resistance to the flow of the exhaust gas, so the pressure of the exhaust gas at the upstream side of the swirling device 60 becomes higher than the pressure of the exhaust gas at the downstream side of the swirling device 60. As a result, the pressure of the exhaust gas in the surrounding of the sensor 6 becomes higher than the pressure of the exhaust gas in the surrounding of the addition valve 5, thus making it possible to suppress the additive agent added from the addition valve 5 from adhering to the sensor 6. Here, note that in this embodiment, the swirling device 60 corresponds to the pressure difference generation unit or resistance unit in the present invention.

Seventh Embodiment

Figure 13:
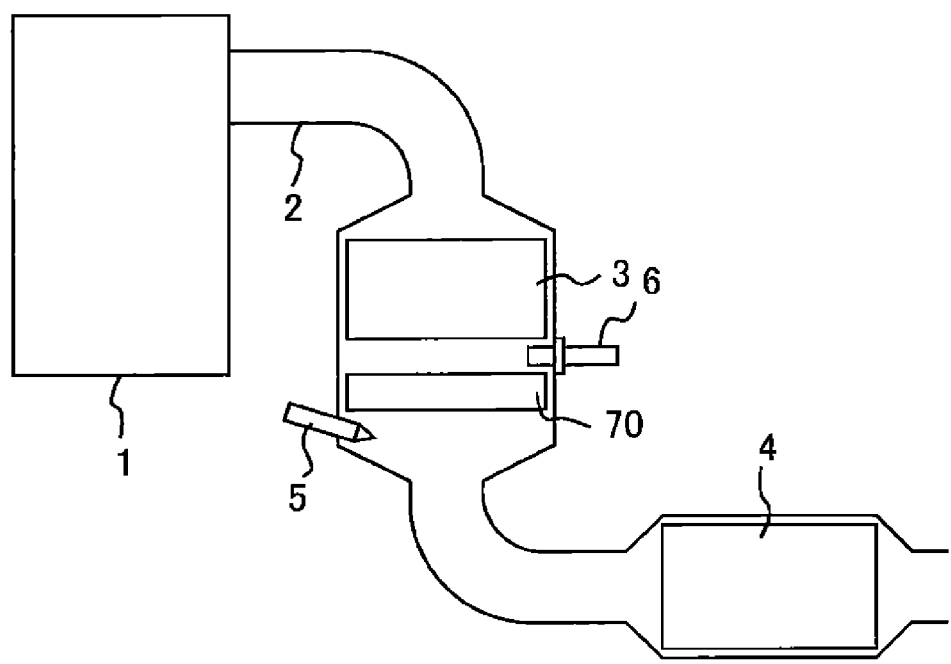
FIG. 13 is a view showing the schematic construction of an exhaust gas purification apparatus for an internal combustion engine according to a seventh embodiment of the present invention.

FIG. 13 is a view showing the schematic construction of an exhaust gas purification apparatus for an internal combustion engine according to this seventh embodiment of the present invention. Mainly, those which are different from FIG. 1 will be explained.

In this embodiment, an oxidation catalyst 70 is arranged between the first exhaust gas purification device 3 and the second exhaust gas purification device 4 and at the immediate downstream side of the first exhaust gas purification device 3. Here, note that only a carrier which does not support a catalyst may be provided, or a device which takes a similar shape may be provided, in place of the oxidation catalyst 70. In addition, a three-way catalyst or a hydrolysis catalyst may be used in place of the oxidation catalyst 70. That is, anything may be used which can just facilitate the reaction of the additive agent.

Then, the sensor 6 is arranged in a portion of the exhaust passage 2 between the first exhaust gas purification device 3 and the oxidation catalyst 70, and the addition valve 5 is arranged in a portion of the exhaust passage 2 between the oxidation catalyst 70 and the second exhaust gas purification device 4. The distance between the first exhaust gas purification device 3 and the oxidation catalyst 70 is set such that the sensor 6 can be arranged between them.

In the exhaust gas purification apparatus for an internal combustion engine as constructed in this manner, the oxidation catalyst 70 acts as a resistance to the flow of the exhaust gas, so the pressure of the exhaust gas at the upstream side of the oxidation catalyst 70 becomes higher than the pressure of the exhaust gas at the downstream side of the oxidation catalyst 70. As a result, the pressure of the exhaust gas in the surrounding of the sensor 6 becomes higher than the pressure of the exhaust gas in the surrounding of the addition valve 5, thus making it possible to suppress the additive agent added from the addition valve 5 from adhering to the sensor 6.

However, in cases where the first exhaust gas purification device 3 is a particulate filter, the particulate matter trapped in the particulate filter reacts with $NO_2$ in the exhaust gas. For this reason, at the time when the exhaust gas passes through the first exhaust gas purification device 3, the ratio of $NO_2$ in NOx drops. Here, in cases where the second exhaust gas purification device 4 is an NOx selective reduction catalyst, if the ratio of $NO_2$ in NOx drops too much, the reduction efficiency of NOx will drop. For that reason, when the particulate matter and $NO_2$ react with each other, there is a fear that the reduction efficiency of NOx in the NOx selective reduction catalyst may drop.

On the other hand, in cases where the oxidation catalyst 70 is provided, NO in the exhaust gas can be oxidized to $NO_2$, so it is possible to suppress the ratio of $NO_2$ in the exhaust gas from dropping too much. In addition, because HC in the exhaust gas can also be oxidized by the oxidation catalyst 70, HC poisoning of the NOx selective reduction catalyst can be suppressed.

Further, the addition valve 5 can be arranged at a location which is close to the oxidation catalyst 70, and hence, the additive agent can be added in a position which is not affected by the influence of the deviation (unevenness) and/or turbulence of the flow of the exhaust gas resulting from the shape of that portion of the exhaust passage 2 which is between the oxidation catalyst 70 and the second exhaust gas purification device 4. For this reason, it is possible to cause the additive agent to disperse in a more even or uniform manner. Moreover, even if turbulence is generated in the flow of the exhaust gas due to the protrusion of the sensor 6 into the exhaust passage 2, this turbulence can be made small by means of the oxidation catalyst 70, so the additive agent can be dispersed in a more even or uniform manner. As a result of these, it is possible to improve the efficiency in purification of the exhaust gas.

Here, note that in this embodiment, the oxidation catalyst 70 corresponds to the pressure difference generation unit or resistance unit in the present invention.

Eighth Embodiment

Figure 14:
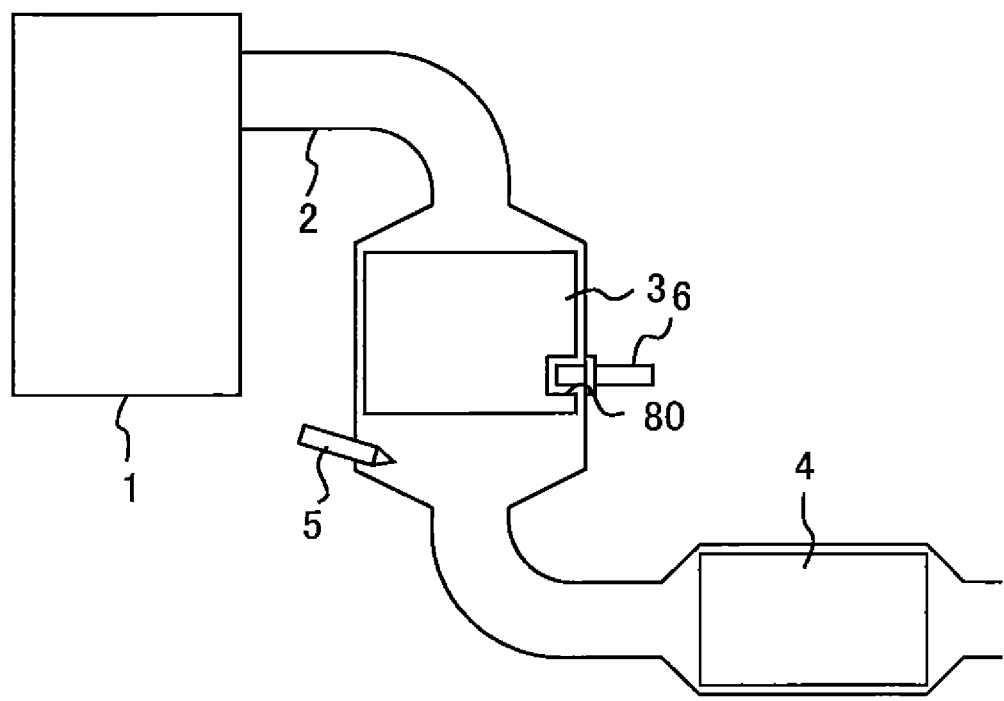
FIG. 14 is a view showing the schematic construction of an exhaust gas purification apparatus for an internal combustion engine according to an eighth embodiment of the present invention.

FIG. 14 is a view showing the schematic construction of an exhaust gas purification apparatus for an internal combustion engine according to this eighth embodiment of the present invention. Mainly, those which are different from FIG. 1 will be explained.

In this embodiment, the first exhaust gas purification device 3 is formed with a concave portion or recess 80 for arranging the sensor 6 therein. This concave portion 80 is formed so as to provide a gap between the sensor 6 and the first exhaust gas purification device 3 in such a manner that the resistance to the flow of the exhaust gas does not become too much large. As a result of this, it is possible to suppress the pressure loss from becoming large, or a decrease in the pressure at the downstream side of the sensor 6 is able to suppress the addive agent from being sucked into the side of the concave portion 80.

In the exhaust gas purification apparatus for an internal combustion engine as constructed in this manner, the first exhaust gas purification device 3 at the downstream side of the sensor 6 acts as the resistance to the flow of the exhaust gas, so that the pressure of the exhaust gas in the surrounding of the sensor 6 becomes higher than the pressure of the exhaust gas in the surrounding of the addition valve 5. For this reason, it is possible to suppress the additive agent added from the addition valve 5 from adhering to the sensor 6.

In addition, the additive agent, even if flows backwards, adheres to a downstream side end portion of the first exhaust gas purification device 3, so it is possible to suppress the additive agent from adhering to the sensor 6. Also, by arranging the sensor 6 in the inside of the first exhaust gas purification device 3, it is possible to suppress a drop in temperature of the sensor 6 at the time when the exhaust gas of low temperature flows therethrough, thus making it possible to decrease the electric power consumption required to keep the temperature of the sensor 6. Moreover, the components of the exhaust gas are made uniform by means of the first exhaust gas purification device 3, so the accuracy in the detection of the sensor 6 can be enhanced.

However, when the temperature of the first exhaust gas purification device 3 has dropped to equal to or lower than an activation temperature thereof, or when the first exhaust gas purification device 3 has been subjected to poisoning by HC, etc., an NOx removal rate in the second exhaust gas purification device 4 is decreased, for example, due to a decrease in the amount of generation of $NO_2$. Even in such a case, the decrease in the generated amount of $NO_2$ can be detected in a quick manner by means of the sensor 6, so that the temperature raising processing and/or the poisoning recovery processing of the first exhaust gas purification device 3 can be started at an early stage.

Here, note that in the case as shown in FIG. 14, the first exhaust gas purification device 3 corresponds to the pressure difference generation unit or resistance unit in the present invention.

Figure 15:
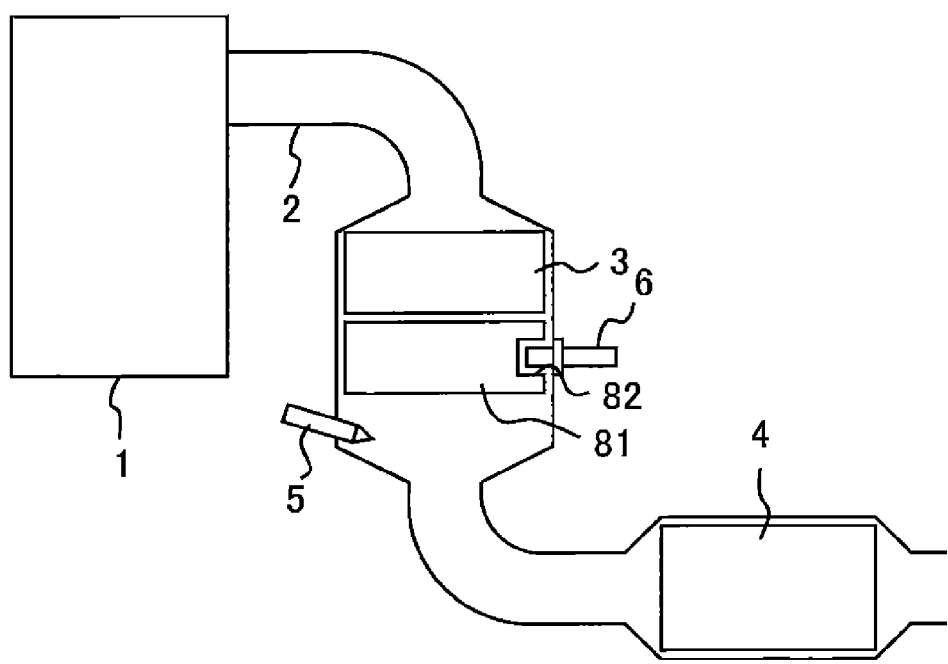
FIG. 15 is another view showing the schematic construction of the exhaust gas purification apparatus for an internal combustion engine according to the eighth embodiment of the present invention.

In addition, FIG. 15 is another view showing the schematic construction of an exhaust gas purification apparatus of an internal combustion engine according to a modified form of this embodiment of the present invention. The first exhaust gas purification device 3 is in the form of a particulate filter. Here, note that an oxidation catalyst or an NOx catalyst may be supported on the particulate filter. An oxidation catalyst 81 is arranged between the first exhaust gas purification device 3 and the second exhaust gas purification device 4 and at the immediate downstream side of the first exhaust gas purification device 3. Here, note that only a carrier which does not support a catalyst may be provided, or a device which takes a similar shape may be provided, in place of the oxidation catalyst 81. In addition, a three-way catalyst may also be provided in place of the oxidation catalyst 81. Then, the oxidation catalyst 81 is formed with a concave portion or recess 82 for arranging the sensor 6 therein. Here, note that a gap between the sensor 6 and the oxidation catalyst 81 is set in a similar manner as in the case of the above-mentioned concave portion 80. The addition valve 5 is arranged at the downstream side of the oxidation catalyst 81.

In the exhaust gas purification apparatus for an internal combustion engine as constructed in this manner, the oxidation catalyst 81 at the downstream side of the sensor 6 acts as the resistance to the flow of the exhaust gas, so that the pressure of the exhaust gas in the surrounding of the sensor 6 becomes higher than the pressure of the exhaust gas in the surrounding of the addition valve 5. For this reason, it is possible to suppress the additive agent added from the addition valve 5 from adhering to the sensor 6.

Moreover, the additive agent, even if flows backwards, adheres to a downstream side end portion of the oxidation catalyst 81, so it is possible to suppress the additive agent from adhering to the sensor 6. Also, by arranging the sensor 6 in the inside of the oxidation catalyst 81, it is possible to suppress a drop in temperature of the sensor 6 at the time when the exhaust gas of low temperature flows therethrough, thus making it possible to decrease the electric power consumption required to keep the temperature of the sensor 6. Further, the components of the exhaust gas are made uniform by means of the oxidation catalyst 81, so the accuracy in the detection of the sensor 6 can be enhanced. Here, note that in the case as shown in FIG. 15, the oxidation catalyst 81 corresponds to the pressure difference generation unit or resistance unit in the present invention.

Figure 16:
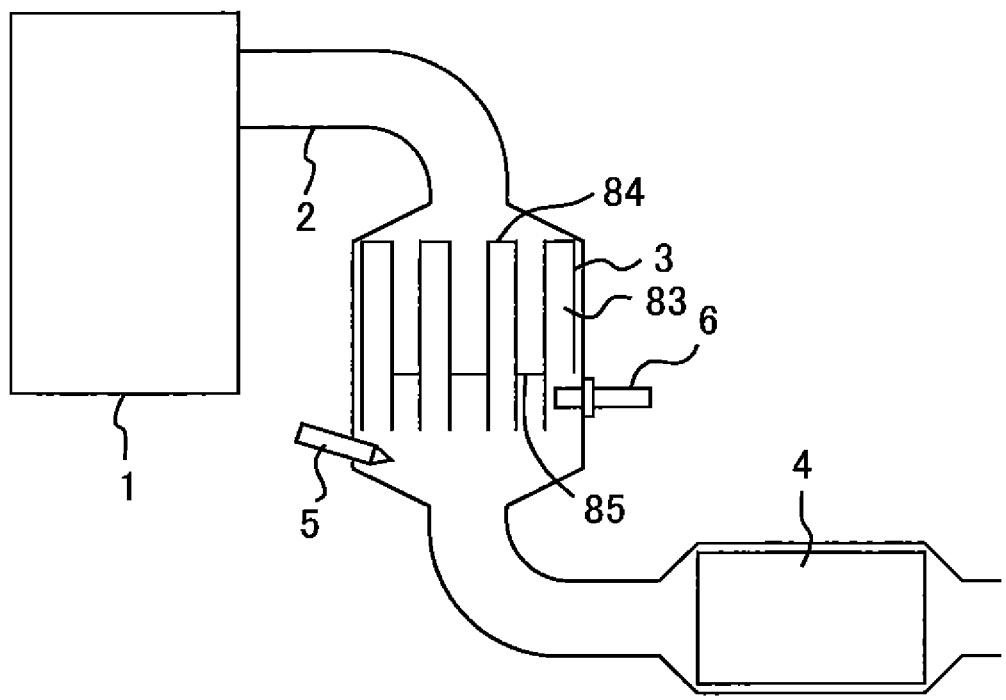
FIG. 16 is another view showing the schematic construction of the exhaust gas purification apparatus for an internal combustion engine according to the eighth embodiment of the present invention.

Further, FIG. 16 is another view showing the schematic construction of an exhaust gas purification apparatus of an internal combustion engine according to another modified form of this embodiment of the present invention. The first exhaust gas purification device 3 is in the form of a particulate filter. Here, note that an oxidation catalyst or an NOx catalyst may be supported on the particulate filter. Then, in order to mount or arrange the sensor 6 at the upstream side of a downstream end of the first exhaust gas purification device 3, a notch is formed in a part of the downstream end of the first exhaust gas purification device 3. This notch is formed in such a manner that the sensor 6 is positioned at the upstream side of the downstream end of the first exhaust gas purification device 3 and at the downstream side of plugs 85.

As shown in FIG. 16, the particulate filter is of a so-called wall flow type which is equipped with a plurality of passages 83 extending in a parallel relation to one another. These passages 83 are composed of passages 83 that have their upstream ends closed by plugs 84, respectively, and passage 83 that are closed by plugs 85, respectively, at locations which are at the downstream side of the upstream ends, respectively, and at the upstream side of the mounting position of the sensor 6. Accordingly, the passages 83, which are closed by the plugs 84 at their upstream ends, respectively, and the passages 83, which are closed by the plugs 85 at the downstream side of the above-mentioned upstream ends and at the upstream side of the mounting position of the sensor 6, are arranged in an alternate manner. With such an arrangement, the exhaust gas measured by the sensor 6 is that exhaust gas which has passed a wall surface of the particulate filter, and hence, the components contained in the exhaust gas are well dispersed, thereby making it possible to carry out measurements with a higher degree of accuracy.

In the exhaust gas purification apparatus for an internal combustion engine as constructed in this manner, the first exhaust gas purification device 3 at the downstream side of the sensor 6 acts as the resistance to the flow of the exhaust gas, so that the pressure of the exhaust gas in the surrounding of the sensor 6 becomes higher than the pressure of the exhaust gas in the surrounding of the addition valve 5. For this reason, it is possible to suppress the additive agent added from the addition valve 5 from adhering to the sensor 6.

In addition, the additive agent, even if flows backwards, adheres to a downstream side end portion of the particulate filter, so it is possible to suppress the additive agent from adhering to the sensor 6. Also, by arranging the sensor 6 in the inside of the particulate filter, it is possible to suppress a drop in temperature of the sensor 6 at the time when the exhaust gas of low temperature flows therethrough, thus making it possible to decrease the electric power consumption required to keep the temperature of the sensor 6. Here, note that in the case as shown in FIG. 16, the first exhaust gas purification device 3 corresponds to the pressure difference generation unit or resistance unit in the present invention.

EXPLANATION OF REFERENCE NUMERALS AND CHARACTERS

1 internal combustion engine
2 exhaust passage 3 first exhaust gas purification device
4 second exhaust gas purification device
5 addition valve
6 sensor
7 partition plate
20 dispersion plate
30 oxidation catalyst
50 cover
51 holes
52 cover
60 swirling device
61 vanes
62 dispersion device
70 oxidation catalyst
80 concave portion
81 oxidation catalyst
82 concave portion
83 passages
84 plugs
85 plugs

The invention claimed is:

1. An exhaust gas purification apparatus of an internal combustion engine comprising:
 a sensor that is arranged in an exhaust passage of the internal combustion engine;
 an addition valve that is arranged in the vicinity of or at the downstream side of said sensor in the direction of flow of an exhaust gas, and adds an additive agent into said exhaust passage;
 a catalyst that is arranged at the downstream side of said addition valve, and receives a supply of the additive agent from said addition valve; and
 pressure difference generation unit that makes a pressure of the exhaust gas in the surrounding of said sensor higher than a pressure thereof in the surrounding of said addition valve;
 wherein said pressure difference generation unit is constructed to be provided with a partition plate that serves to separate an exhaust gas which flows through the surrounding of said sensor, and an exhaust gas which flows through the surrounding of said addition valve, from each other; and
 said exhaust passage is separated into two exhaust passage portions by means of said partition plate, and said sensor is arranged in one of the exhaust passage portions, whereas said addition valve is arranged in the other of the exhaust passage portions, wherein the one exhaust passage portion with said sensor arranged therein is formed with a part of which a channel cross section becomes small.

* * * * *